United States Patent [19]

Lucas et al.

[11] Patent Number: 5,445,069
[45] Date of Patent: Aug. 29, 1995

[54] CITRUS JUICER

[75] Inventors: Rafael P. Lucas, Barcelona; Jose C. Blasco, L'Hospitalet; Antonio R. Rius, Manresa/Barcelona, all of Spain

[73] Assignee: Braun Aktiengesellschaft, Kronberg, Germany

[21] Appl. No.: 842,245

[22] Filed: Feb. 27, 1992

Related U.S. Application Data

[62] Division of Ser. No. 580,662, Sep. 11, 1990, Pat. No. 5,193,447.

[30] Foreign Application Priority Data

Sep. 16, 1989 [DE] Germany .......... 39 31 015.9
Sep. 16, 1989 [DE] Germany .......... 39 31 016.7

[51] Int. Cl.⁶ .................... A23N 1/00; A47J 43/14
[52] U.S. Cl. ............................ 99/508; 99/503; 99/502
[58] Field of Search ............. 99/501, 502, 503, 505, 99/506, 508; 210/377; 100/213, 132, 111

[56] References Cited

U.S. PATENT DOCUMENTS

| 2,186,672 | 1/1940 | Fromm | 99/503 |
| 2,282,623 | 5/1942 | Torrence | 99/503 |
| 2,295,922 | 9/1942 | Weston | 99/503 |
| 2,552,572 | 5/1951 | Mikina | 99/503 |
| 3,566,939 | 3/1971 | Hubrich | 99/501 |
| 4,080,885 | 3/1978 | Pauty | 99/501 |
| 4,378,730 | 4/1983 | Coggiola | 99/501 |

FOREIGN PATENT DOCUMENTS

| 0052697 | 6/1982 | European Pat. Off. | 99/501 |
| 1729913 | 3/1968 | Germany . | |
| 3923865 | 7/1989 | Germany | 99/501 |
| 0362806 | 6/1962 | Switzerland | 99/503 |
| 10646/60 | 7/1965 | Switzerland | 100/132 |
| 1245869 | 9/1971 | United Kingdom | 99/501 |

Primary Examiner—David A. Scherbel
Assistant Examiner—Reginald L. Alexander
Attorney, Agent, or Firm—Fish & Richardson

[57] ABSTRACT

This invention relates to a citrus juicer for producing fruit juices. The motor-driven cone (11) is surrounded on all sides by a strainer (20) having passageways (27) under which a bowl for collecting the fruit juice is disposed. As a citrus fruit is squeezed, the resulting juice passes through the passageways of the strainer. The boundary area between the cone (11) and the area of the strainer (20) surrounding it is configured as an annular gap (25) whose cross section of passage is adapted to be increased or decreased by means of an adjusting device. The pulp content in the fruit juice is thereby predetermined.

10 Claims, 5 Drawing Sheets

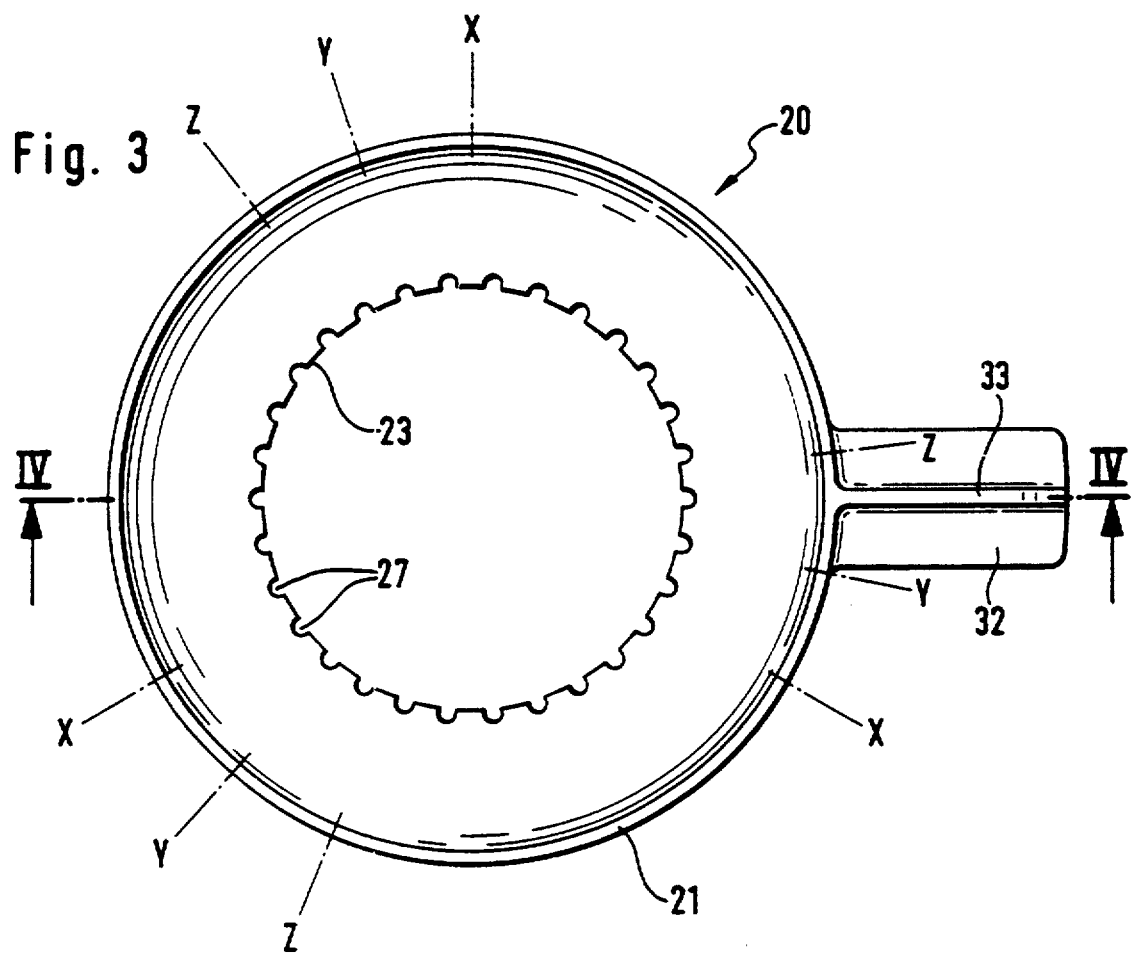
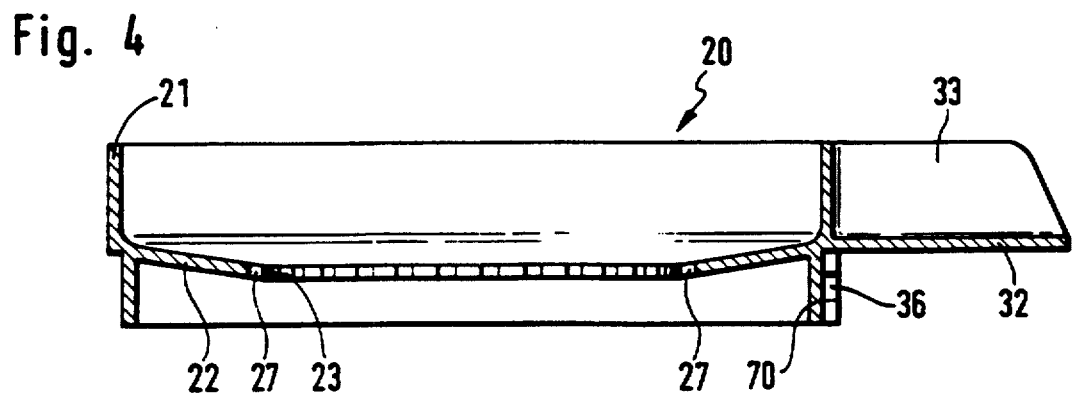

CITRUS JUICER

This is a divisional of application Ser. No. 07/580,662 now U.S. Pat No. 5,193,447, filed Sep. 11, 1990.

This invention relates to a citrus juicer for producing fruit juice, including a cone driven by a drive shaft of a motor and surrounded on all sides by a strainer provided with passageways under which a bowl having an inner wall and collecting the fruit juice is disposed, with the juice of a citrus fruit passing through the passageways of the strainer as it is squeezed, while the pulp is largely retained by the passageways of the strainer.

Citrus juicers of this type have been offered in the market for many years, among others also by the Braun Aktiengesellschaft of Kronberg (see page 35 of Programmübersicht Herbst 1988 (Fall 1988 Program Overview)). In these citrus juicers, it is to be considered less advantageous that the fixed size of the strainer apertures predetermines both the size of the pulp particles and the pulp content in the collecting bowl, that is, the ratio of pulp content to juice content is always constant, in dependence on the size of the apertures.

It is, therefore, an object of the present invention to provide an electrically powered citrus juicer in which the percentage of pulp in the juice is determinable by simple means prior to or during the fruit squeezing operation.

According to the present invention, this requirement is satisfied in that apertures are provided in the radially extending area between the cone and the inner wall of the collecting bowl, the cross sections of passage of these apertures being adapted to be increased or decreased by means of an adjusting device. The advantage achieved with this invention is that it affords the possibility in a citrus juicer to determine the pulp content in the fruit juice before or during the squeezing operation.

In a first embodiment of this invention, the boundary area between the cone and the area of the strainer surrounding the cone is configured as an annular gap of variable cross section. This first solution enables the strainer passageways, if any, to remain unchanged in cross section, consequently enabling the fruit juice and a specific size of pulp material to pass through the passageways, while only pulp material corresponding to the size of the annular gap, including also larger pieces of pulp, passes through the annular gap.

It is particularly advantageous that for the purpose of varying the cross section the cone and/or the strainer are relatively vertically adjustable by a vertical adjusting device and that the circumferential surface of the cone and/or the strainer varies in a radial direction in the area of the variation of the cross section of the annular gap. In this arrangement, it is necessary for either the strainer or the cone or both components to be relatively adjustable in order to vary the area of cross section of the annular gap. If the annular gap is large, the juice will contain a major portion or even all of the pulp, while with a smaller annular gap the pulp content in the juice will be less or almost nil.

A particularly simple first embodiment of a citrus juicer of the invention is accomplished if the strainer is carried in the collecting bowl and if the vertical adjusting device is provided intermediate the strainer and the collecting bowl.

In this arrangement, it has proved advantageous to have the vertical adjusting device between the strainer and the bowl formed by a self-locking thread. The small turning motion of the strainer relative to the collecting bowl or vice versa already results in a sufficiently large variation of the width or cross section of passage of the annular gap. Securely locating the two components in their relative positions is not absolutely necessary because of the self-locking thread. Equally, it is also conceivable to select a non-selflocking thread, this arrangement then requiring the adjustable component to be held at various elevations by a locking arrangement or some other retaining device to provide an annular gap which remains unchanged at this particular elevation.

However, it is also possible to use for the vertical adjusting device, instead of the thread, at least three projections spaced on the periphery of the strainer or the collecting bowl, which are adapted to lock into recesses correspondingly spaced on the periphery of the collecting bowl or the strainer, with three recesses which combine to form a group being arranged at the same elevation, while further groups of recesses with the same spacing as the projections are provided at another elevation on the collecting bowl or the strainer. In contrast to the embodiment incorporating the thread, this embodiment has the advantage that for one thing the vertical adjusting device is not infinitely variable but has individual latching positions, and that for another thing it is substantially more stable and less prone to tilting over. The locking-type adjustment is advantageous for the operator because the annular gap can be adjusted step by step to various settings including coarse, medium or fine. Because the cone, the strainer or the collecting bowl are components made of plastics material, both the projections and the recesses can be integrally formed with these components without incurring extra cost. It should be readily apparent that it is also possible to provide the tenons and the recesses on the components in an equivalent form, such that, for example, the vertical adjusting device comprises at least three recesses spaced on the periphery of the strainer or the collecting bowl, for locking engagement with correspondingly formed projections provided on the periphery of the collecting bowl or the strainer. Both embodiments afford ease of implementation. For maximum stability of the strainer in its location in the collecting bowl, three projections and recesses were selected. It will be understood that a plurality of mating projections and recesses may be provided, if necessary.

To switch from the settings "fine" to "medium" or even "coarse" as quickly as possible during operation, an improvement of the invention provides for the recesses juxtaposed at various elevations to be linked by several groove sections connecting the recesses and for the projection to engage in the groove sections in a sliding relationship thereto.

Placing the strainer in the collecting bowl without impediment by the projections is accomplished in that the groove is connected with a groove which extends in the direction of the vertical adjustment away from the recess and up to the rim of the strainer or the collecting bowl. This arrangement further has the advantage that removal of the strainer from the collecting bowl is only possible in a specific position, that is, when the grooves extending parallel to the drive shaft or parallel to the vertical adjustment direction of the strainer are level with the recesses. In all other positions the strainer is held captive in the collecting bowl because of the grooves extending essentially in a transverse direction and connecting the individual recesses with one another.

In a second embodiment relating to the arrangement of the adjusting device, the invention provides for the vertical adjustment to occur between the cone and the drive shaft. This is accomplished in that the drive shaft of the electric motor or the driven shaft of the cone are variable in length. The variation in length may be accomplished, for example, by providing spacing means between the end of the drive shaft and the support of the driven shaft of the cone. However, it is also conceivable to lower the electric motor together with the drive shaft in the housing of the citrus juicer.

In a third embodiment relating to the arrangement of the adjusting device of the invention, the strainer rests on the collecting bowl and the vertical adjusting device is provided between the collecting bowl and a motor housing carrying the collecting bowl or accommodating the drive unit. In this embodiment, the collecting bowl, together with the strainer, is vertically adjusted relative to the cone as it is turned, causing the collecting bowl to be lifted clear of the motor housing or to be lowered. In this arrangement, the vertical adjusting device comprises at least three projections spaced on the periphery of the collecting bowl or the motor housing and engaging with recesses provided on the periphery of the motor housing or on the collecting bowl, with the recesses being formed by sections of a thread of like lead.

To permit a step-by-step adjustment of the annular gap in which the individual steps should be as small as possible, an improvement of the invention provides for a spring to be secured to the motor housing, the spring locking into locking means provided on the collecting bowl to form a locking device. The locking device or latching means further has the advantage of enabling an operator to set the annular gap quickly and accurately to a specific size without the need to observe a specific setting angle.

In a second embodiment of the invention, the strainer has its outer periphery bounded by the inner wall of the collecting bowl, and the boundary area between the strainer and the inner surface of the collecting bowl is configured as an annular gap, with the strainer being vertically adjustable relative to the collecting bowl and the inner surface along the length of the vertical adjustment being a conical or stepped annular surface. In this embodiment, accordingly, the annular gap is formed between the collecting bowl and the strainer. For vertical adjustment of the strainer relative to the collecting bowl, a vertical adjusting device is likewise provided which may be constructed in accordance with a vertical adjusting device already mentioned in the foregoing. In this second invention, an annular gap having a substantially larger annular surface is formed, because the annular gap is provided between the inner surface of the collecting bowl and the outer rim of the strainer.

If the strainer is arranged to take support upon the collecting bowl, it will be advantageous if the vertical adjusting device comprises a thread means provided between the strainer and the collecting bowl. By contrast, if the strainer takes support upon the cone, the vertical adjusting device is provided between the cone and the motor housing, with the strainer then bearing against the cone in a sliding relationship thereto. It will be understood that a locking device locating the strainer or the collecting bowl in a fixed position at various elevations may be substituted for the thread.

To ensure that pulp and juice flow always to the annular gap, it is suggested in an improvement of both inventions that the strainer be inclined down towards the annular gap.

By providing the passageways close to the annular gap on the strainer, the juice passes only through these passageways in addition to flowing through the annular gap. With the annular gap nearly closed, juice and pulp particles are only allowed to flow through the passageways into the collecting bow. This arrangement is applicable to both inventions.

To obtain a still better adaptation of the cross section between the annular gap and the passageways, it is further suggested for both inventions that a major part of the passageways be open towards the annular gap. The determination as to which pulp particles shall be allowed to reach the collecting bowl is optimized still further by having all passageways terminate into the annular gap. This results in the significant advantage of permitting particular ease of cleaning of the strainer, because all pulp particles can be brushed or rinsed out of the open passageways for cleaning.

To be able to determine the desired amount of pulp in the juice particularly accurately, the passageways are provided exclusively in the proximity of the annular gap on the strainer, with the remaining annular area of the strainer which extends towards the collecting bowl essentially having no passageways. Thus it is ensured that all of the juice, but only a specific size and amount of pulp particles is allowed to pass through the cross section of aperture formed by the annular gap and the passageways.

In a third embodiment of the invention, the apertures are formed by passageways in the strainer whose cross sections of passage are increased by removing wholly or in part a cover reducing their areas of cross section. In contrast to the previous examples, the size of the annular gap is not adjusted by vertical adjustment of the individual components, instead the cross sections of the individual strainer passageways are increased or reduced by a cover. The variation of cross section of the passageways is thus accomplished by means of a sliding seat valve arrangement.

This principle can be implemented with particular ease in that the cover is formed by a rotary disc, that the disc has passageways provided at the same locations as on the strainer, and that the disc is located centrally relative to the strainer. If the individual passageways on the strainer and on the rotary disc are spaced at a sufficient relative distance, the flow of juice and pulp through the strainer may be shut off entirely. Both the strainer and the rotary disc afford particular ease of manufacture because the passageways provided on both components may be identical in respect of size and location relative to the strainer and, respectively, the rotary disc.

To be able to locate the rotary disc centrally on the strainer, the rotary disc may be snap-mounted onto a tenon provided on the strainer, for example.

If, for example, the passageways on the strainer are arranged in a radial direction successively and on individual segments, the cover may also be formed by strips.

Several embodiments of the invention will now be described in more detail in the following with reference to the accompanying drawings. In the drawings, FIG. 1 is a partial longitudinal sectional view of the upper area of an electrically powered citrus juicer of the invention in the off position, wherein the strainer is vertically adjustable relative to the collecting bowl;

FIG. 3 is a top plan view of the strainer illustrated in FIGS. 1 and 2, however, with the cone and the motor housing removed;

FIG. 4 is a sectional view of the strainer taken along the line IV—IV of FIG. 3;

Figure 8:
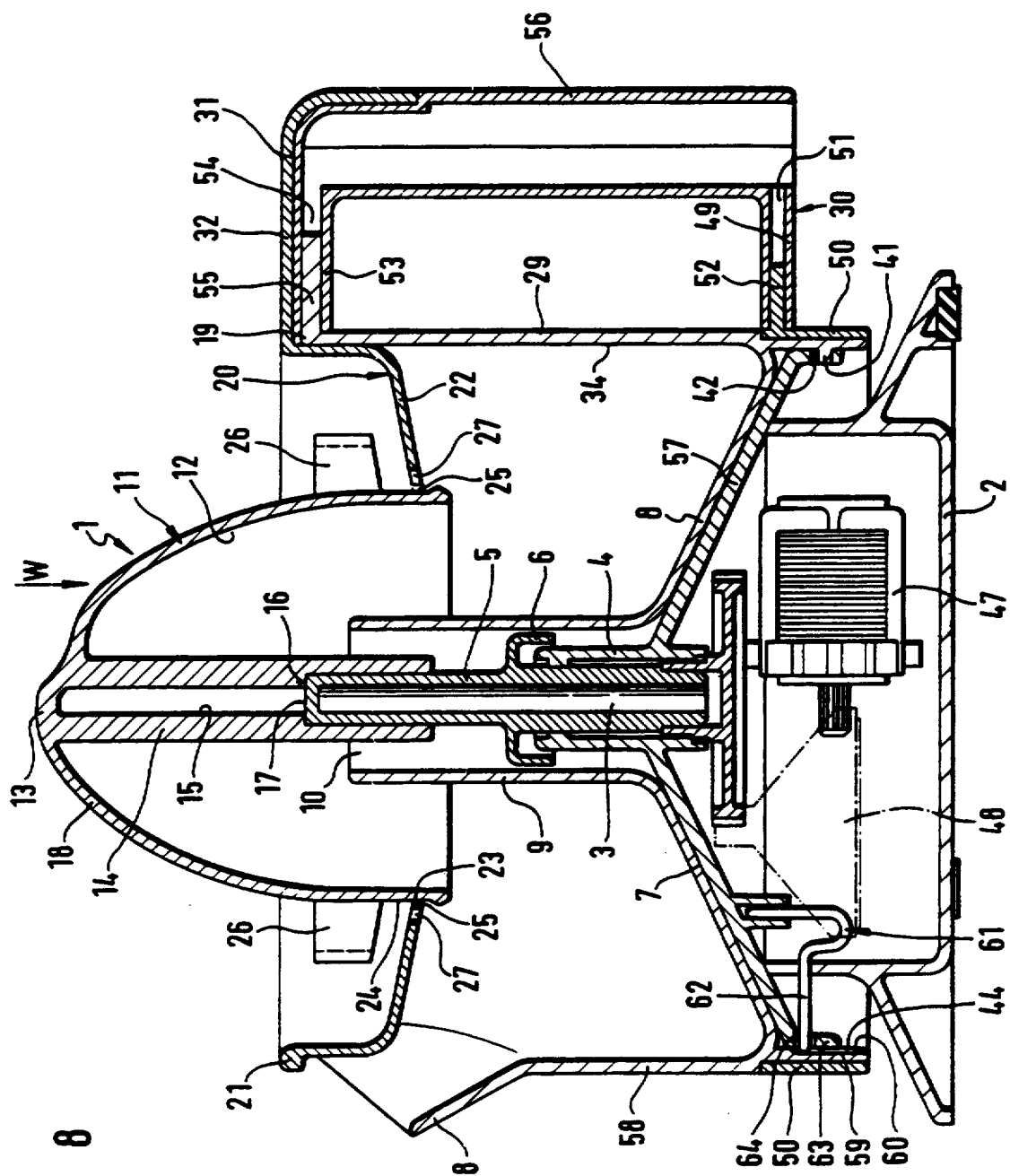
Figure 9:
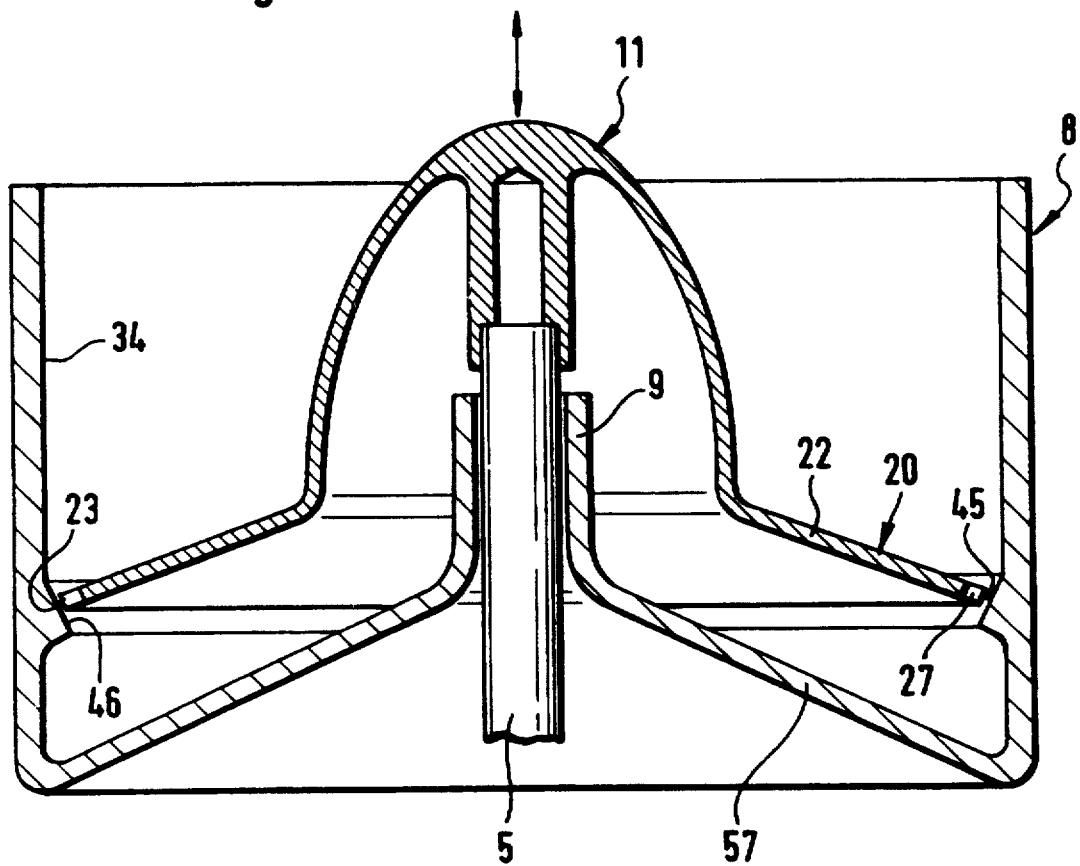

FIG. 8 is a longitudinal sectional view of a citrus juicer illustrating a second embodiment of the first invention in which the strainer rests on the collecting bowl and in which the collecting bowl together with the strainer is vertically adjustable relative to the cone; and FIG. 9 is a longitudinal sectional view of a citrus juicer constructed in accordance with a second invention, shown without the motor housing, in which the annular gap is provided between the inner rim of the collecting bowl and the outer rim of the strainer.

Figure 1:
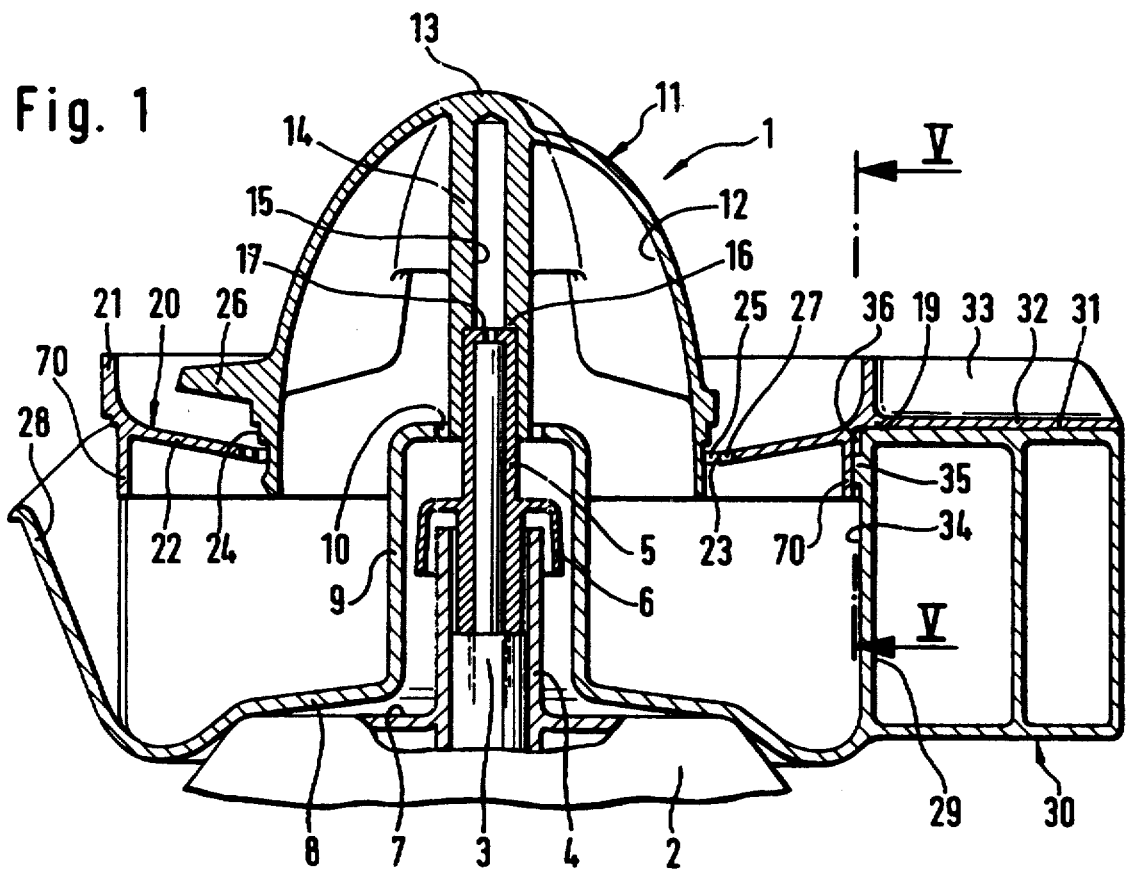

Referring now to FIG. 1, there is only shown the upper part of the citrus juicer 1, whereas FIG. 8 illustrates a complete citrus juicer. The citrus juicer 1 comprises a housing 2 configured as a base and accommodating a horizontally mounted electric motor 47 illustrated in FIG. 8. The electric motor 47 is connected to a drive shaft 3 by means of a gear train 48. In accordance with FIGS. 1 and 8, the drive shaft 3 penetrates the housing 2 upwardly when viewing the drawing, extending through a cylindrical post 4. The end area of the drive shaft 3 has injection-molded around it a plastic sheath 5 configured as a hexagon in cross section and includes in the area of the free end of the post 4 a downwardly directed bell-shaped skirt 6 serving on the one hand the function of preventing coarse contaminants or even splashes of water from entering the motor housing 2 through the post 4, while on the other hand serving as a bearing for the plastic sheath 5 on the post 4 and thus as a bearing for the cone 11 on axial displacement in the direction W for energization of the electric motor 47.

Supported and located centrally on the upper side 7 of the housing 2 shown in FIGS. 1 and 8 is a bowl 8 to collect the juice. The collecting bowl 8 includes a cylindrical dome 9 surrounding the post 4 and the drive shaft 3 and serving to enable the juice collecting in the bowl 8 to reach a relatively high level while preventing the juice from spilling out through the opening 10.

In FIGS. 1 and 8, a cone 11 is seated down on the plastic sheath 5 which is in positive engagement with the drive shaft 3, the cone having a bell-shaped cavity 12 open towards the collecting bowl 8. From the tip 13 of the cavity 12, a sleeve-shaped driven shaft 14 extends downwardly into the cavity 12, its bore which is equally configured as a hexagon surrounding the plastic sheath 5 of the drive shaft 3 nearly without any clearance. Inside the bore 15 is a step 16 bearing against the end surface 17 at the end of the plastic sheath 5 of the drive shaft 3.

When a citrus fruit is pushed down onto the cone 11, the cone 11 bears axially against the end of the post 4, which is part of the housing 2 of the citrus juicer, through the plastic sheath 5 and the skirt 6.

Figure 2:
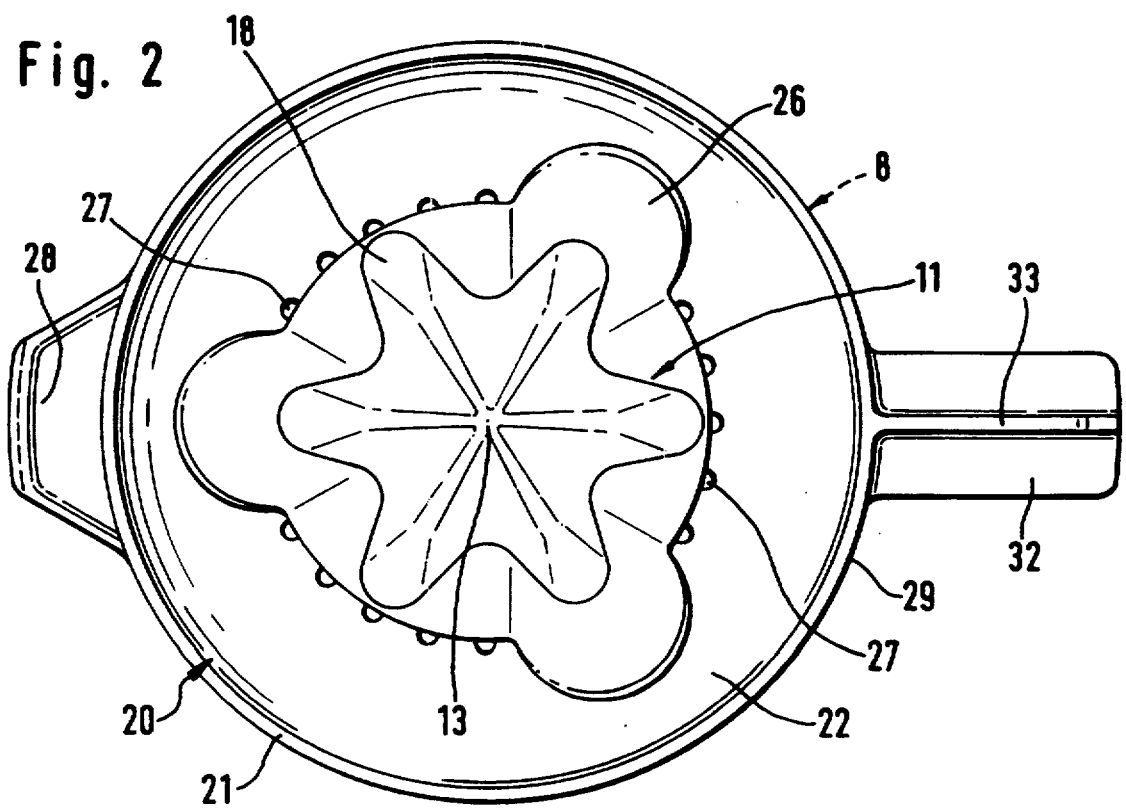
FIG. 2 is a top plan view of-the citrus juicer of FIG. 1.

According to FIG. 2, protruding ridges are formed on the cone 11 as they have been known for a long time from other citrus juicers, no matter whether operated mechanically or electrically. In FIG. 8, a substantially annular strainer 20 having an annular collar 21 upwardly directed on the rim is seated on the rim 19 of the collecting bowl 8. In FIG. 1, the strainer 20 is seated into the collecting bowl 8, bearing through its recesses 36 against projections 35 of the collecting bowl 8. In FIGS. 1 and 8, the bottom 22 of the strainer 20 is of substantially annular configuration, extending in slightly conical fashion downwardly towards the cone 11. This ensures that the juice and the pulp flowing down from the cone 11 and collecting on the bottom 22 are always moved towards the cone 11.

In FIGS. 1 to 8, the bottom 22 of the strainer 20 includes a circular rim 23 extending at a short distance from the circumferential surface 24 of the cone 11 which in this area is enlarged conically in downward or upward direction. This results in an annular gap 25 between these components which determines, depending on its size which in turn depends on the lifting or lowering of the strainer 20 relative to the conical surface 24, whether large or small particles of pulp shall be allowed to enter the collecting bowl 8.

In FIGS. 1 to 4 and 6 to 8, adjoining the rim 23 of the strainer 20 are radially outwardly extending passageways 27 which are open towards the annular gap 25 for ease of cleaning of the strainer 20 and the passageways 27. Slightly above the circumferential surface 24, radially protruding scrapers 26 are integrally formed on the cone 11, the scrapers essentially serving the function of pushing small pieces of pulp through the passageways 27 to keep the passageways 27 substantially clear of excessively coarse pulp residues. This is accomplished in that, with the cone 11 revolving, pulp residues which are too coarse to pass through the passageways are pushed radially outwardly by the scrapers 26 where they remain. As a rule, these pulp particles are thus not added to the juice.

Figure 5:
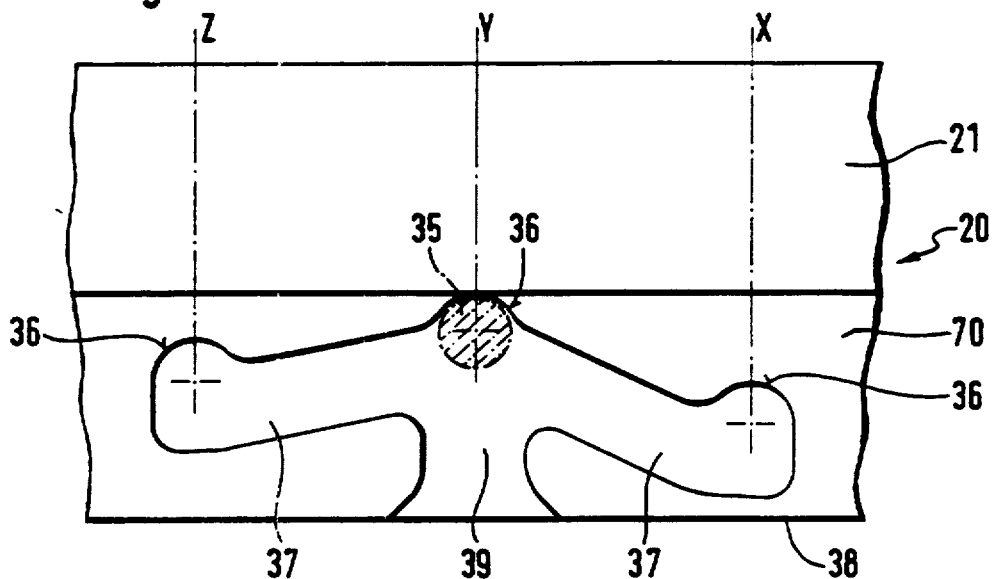
FIG. 5 is a partial longitudinal sectional view of the citrus juicer taken along the line V—V of FIG. 1 in the area of only one of the three adjusting devices.

In FIGS. 1, 2 and 8, the collecting bowl 8 has a spout 28 for pouring the juice. On the opposite side thereof, FIG. 1 shows a manipulating handle 30 integrally formed with the circumferential cylindrical surface 29 and including on its upper side 31 a handle portion 32 extending from the strainer 20 radially outwardly and adapted to the upper side of the manipulating handle 30, the handle portion having in its center a rib member 33, serving to withdraw the strainer 20 from the collecting bowl 8. Protruding from the inner wall 24 on the side close to the bottom 22 of the strainer 20 is a projection 35 of cylindrical cross section which engages a recess 36 of the strainer 20 as shown in FIGS. 1 and 5. In FIGS. 1 and 4, the recess 36 is formed on the annular collar 70 bounding the bottom 22 in downward direction.

In contrast to FIG. 1, in FIG. 8 the manipulating handle 30 is mounted on the opposite side of the spout 28 on the collecting bowl 8 by having a ring 50 which is welded or cemented to the lower bracket 49 of the manipulating handle 30 surround the lower annular step 59 of the collecting bowl 8 without clearance. The connection at the weld mark is formed by a flange 52 extending from the ring 50 to engage a recess 51 in the bracket 49. Provided on the upper bracket 53 of the manipulating handle 30 in FIG. 8 is likewise a slot 54 which is engaged by a flange 55 extending radially outwardly on the upper rim 19 of the collecting bowl 8 and connected with the bracket 53 by ultrasonic sealing or cementing. Thus, the manipulating handle 30 is firmly connected with the collecting bowl 8. A handle portion 32 connected with the strainer 20 and formed flush with the center portion 56 of the manipulating handle 30 rests on the upper side 31 of the upper bracket 53.

In FIG. 8, the upper side 7 of the housing 2 forms a cone increasing in diameter downwardly. The bottom 57 of the collecting bowl 8 is conformed to this contour, resting against the upper side 7. Adjoining the cylindrical wall 58 at the radially outer end of the bottom 57 is the annular step 59 having on its inner wall 60 upwardly extending locking means 44 in the form of grooves. To provide a locking device or latching means, an arm 62 of a spring 61 secured in the housing 2 engages transversely one of these locking means 44, with the arm 62 extending to the outside through a through hole 64 in an annular collar 63 formed integral with the radially outer end of the cone 7. To improve the latching action, it is also possible to provide several such springs 61 and grooves 44 in this area on the circumference of the annular step 59.

As becomes apparent from FIGS. 3 and 5, the recess 36 for vertical adjustment of the strainer 20 relative to the collecting bowl 8 and the cone 11 provides three latching positions X, Y, Z arranged three times at a spacing of 120° on the circumference of the annular collar 21 in order to ensure that the strainer 20 is at all times carried in a stable position in the collecting bowl 8. As clearly shown in FIG. 5, the strainer 20 in latching position Y as shown reflects the position producing the maximum annular gap 25. In this position, the rim 23 is farthest from the opposite circumferential surface 24, that is, the rim 23 does not surround the circumferential surface 24 (FIG. 1). Latching position Z defines the intermediate position. Latching position X reflects the minimum position in which only small pieces of pulp material are allowed to drop into the collecting bowl 8.

In FIG. 5, the recesses 36 are interconnected by means of grooves 37. In this arrangement, the grooves 37 are dimensioned sufficiently wide to enable a respective projection 35 to slide therein. Extending from the bottom edge 38 of the annular collar 21 vertically upwardly in FIG. 5 is a further groove 39. This groove serves the function of enabling the projection 35 to enter the grooves 37.

FIG. 6 shows again the position in which the annular gap 25 is at its minimum, that is, position X.

Figure 7:
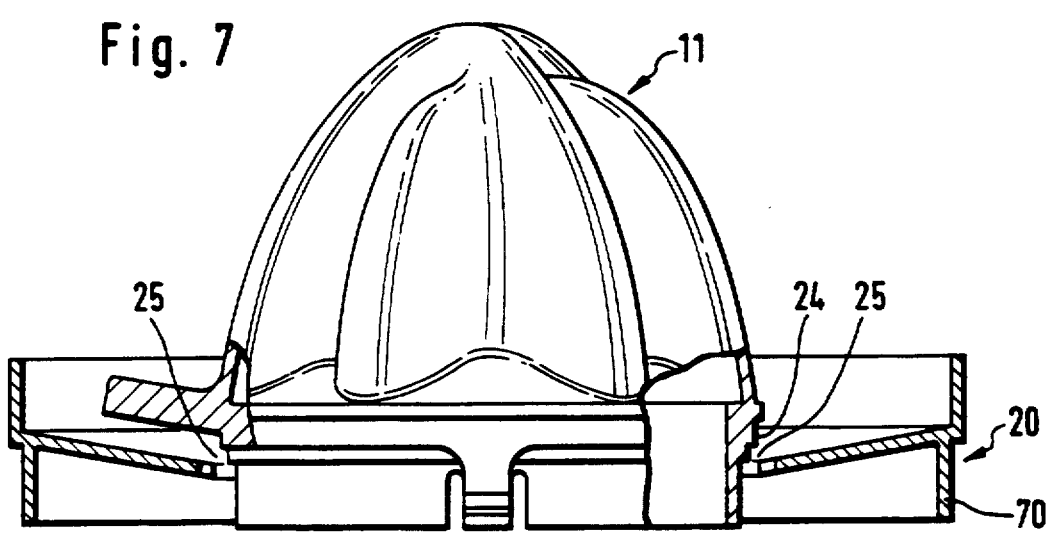
FIG. 7 is the same sectional view as in FIG. 6, but showing the annular gap of the invention at its maximum cross section which corresponds to the position of the strainer illustrated in FIG. 5.

FIG. 7 shows the position in which the annular gap 25 is at its maximum, that is, position Y.

In FIG. 8, the vertical adjusting device comprises three recesses 42 evenly spaced on the outer periphery of the annular collar 63 in the form of threads or steps, for engagement by a respective projection 41 protruding from the inner surface of the annular step 59 of the collecting bowl 8. It will be understood that the recesses 42 of FIG. 8 may be configured in the same way as the recesses 36 of FIG. 5, being provided with a vertically extending groove 39 for receiving the projections 35 and 41, respectively. In FIG. 8, when the collecting bowl 8 is placed down onto the motor housing 2, it thus has to be aligned relative to the projections 41 such as to enable the projections 41 to engage the grooves 39. The same applies to the spring arm 62 which engages in a groove 44 in the process. The collecting bowl 8 is located centrally by means of the annular step 59 on the annular collar 63 of the motor housing 2.

To avoid repetitions, like parts have been assigned like reference numerals throughout the FIGS. 1 to 9.

The mode of operation of the citrus juicer of the invention as shown in FIGS. 1 to 8 is as follows:

After all parts—including collecting bowl 8, strainer 20 and cone 11—are placed down onto the housing 2 in accordance with FIGS. 1 and 8, it is first determined what amounts of pulp shall be allowed in the juice. If, for example, a very clear juice is required, position X (not shown in FIG. 8) is selected by turning the strainer 20 in accordance with FIGS. 1 and 5 or by turning the collecting bowl 8 in accordance with FIG. 8 to the left in order to obtain the smallest possible annular gap 25.

Then a fruit half of, for example, a lemon or orange, is pushed down onto the cone 11. The pressure acting on the plastic sheath 5 and the drive shaft 3 downwardly in FIGS. 1 and 8 results in a slight downward displacement of the drive shaft 3 with the plastic sheath 5, causing a switch, not shown in the drawings, and the electric motor 47 to be turned on so that the cone 11 starts to rotate.

As this occurs, the cone 11 of FIGS. 1 and 8 bears against the end of the post 4 through the skirt 6 (this operating position being not shown, however). It would also be possible to arrange for the citrus juicer to be turned on by a manually operable switch.

With the cone 11 in operation, the juice pressed from the fruit by the ridges 18 and the pieces of pulp squeezed off by the ridges 18 reach the bottom 22 of the strainer 20. While the juice and small pieces of pulp immediately drop into the collecting bowl 8 through the strainer 20, other pieces of pulp or fruit which are too large to pass the passageways 27 of the strainer 20 flow inwardly towards the cone 11 or, in the event of a scraper 26 being provided, outwardly. Depending on the size of the annular gap 25 which is set by the vertical adjusting device 35, 36, 37, the invention thus provides for the passage of only smaller or also larger pieces of pulp through the annular gap 25.

Figure 6:
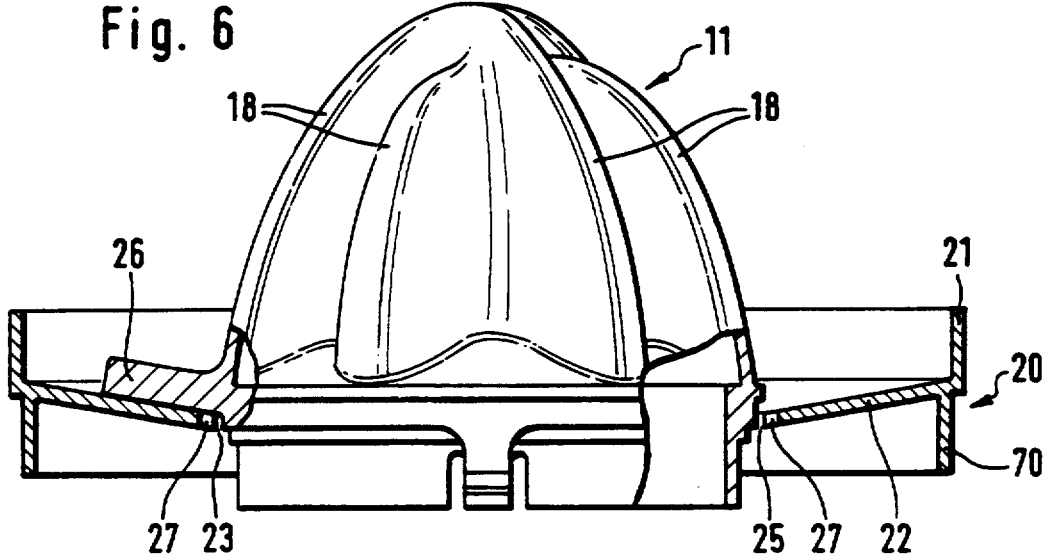
FIG. 6 is a partial longitudinal sectional view of the cone and the strainer, with the annular gap of the invention being shown at its minimum width.

As becomes apparent from FIG. 6, in the fine setting of the strainer 20 relative to the cone 11, the distance between the scrapers 26 and the bottom 22 of the strainer 20 is nearly 0 millimeters, while in FIG. 7 this distance is 5 millimeters, approximately. Accordingly, the distance between the scrapers 26 and the bottom 22 of the strainer 20 serves likewise as an important criterion for the pulp content in the juice when one or more such scrapers are provided on the cone 11.

In FIG. 9, the strainer 20, for example, is integrally formed with the cone 11. The cone 11 is connected to the plastic sheath 5 of the drive shaft in a non-rotating relationship thereto and is vertically adjustable together with the strainer 20 by a vertical adjusting device provided between the plastic sheath 5 and the cone 11 and not shown here in greater detail. Provided on the inner wall 34 of the collecting bowl 8 is a conical annular surface 46 tapering inwardly and downwardly and having opposite thereto the radially outer rim 23 of the strainer 20 to provide the annular gap 45. Passageways 27 open towards the outside are formed on the rim 23.

The bottom 22 of the strainer 20 is on all sides inclined down towards the annular surface 46 to enable the juice and the pulp to flow to the annular gap 45. As the cone 11 with the integral strainer 20 is vertically adjusted, the area of the annular gap 45 will change such that depending on the adjustment pieces of pulp of varying size are allowed to pass the annular gap 45.

We claim:

1. A citrus juicer for producing fruit juice comprising a cone, drive shaft structure coupled in driving relation to said cone for driving said cone in rotation, a strainer surrounding said cone, a collecting bowl under said strainer, said bowl having an inner wall and adapted to collect fruit juice, said strainer having its outer periphery bounded by said inner wall of said collecting bowl, the boundary area between said strainer and said inner wall of said collecting bowl being configured as an annular gap, the juice of a citrus fruit passing through said annular gap as said fruit is squeezed, while the pulp is largely retained by said strainer and annular gap, and adjusting structure for producing relative motion between said strainer and said bowl in the vertical direction to vary the cross-sectional area of said annular gap and to thereby control an amount of pulp passing into said collecting bowl through said annular gap.

2. A citrus juicer as claimed in claim 1, wherein said inner wall is configured as a conical or stepped annular surface in the area of the variation of cross section of said annular gap.

3. A citrus juicer as claimed in claim 2 wherein said adjusting structure includes a vertical adjusting device for vertically adjusting said strainer relative to said annular gap.

4. A citrus juicer as claimed in claim 3, wherein said vertical adjusting device comprises a thread means provided between said strainer and said collecting bowl.

5. A citrus juicer as claimed in claim 3 wherein said vertical adjusting device is provided between said cone and said drive shaft housing.

6. A citrus juicer as claimed in claim 2 wherein said strainer is inclined down towards said annular gap.

7. A citrus juicer as claimed in claim 2 and further including passageways in said strainer close to said annular gap.

8. A citrus juicer as claimed in claim 7, wherein said passageways are open towards said annular gap.

9. A citrus juicer as claimed in claim 8, wherein all of said passageways terminate into said annular gap.

10. A citrus juicer as claimed in claim 7 wherein said passageways are provided exclusively in the proximity of said annular gap on said strainer and that the remaining annular area of said strainer which extends towards said cone essentially has no passageways.

* * * * *

UNITED STATES PATENT AND TRADEMARK OFFICE
CERTIFICATE OF CORRECTION

PATENT NO. : 5,445,069

DATED : August 29, 1995

INVENTOR(S) : Lucas et. al.

It is certified that error appears in the above-identified patent and that said Letters Patent is hereby corrected as shown below:

Col. 2, line 32, replace "Because-the" with --Because the--

Col. 4, line 10, replace "bow" with --bowl--

Col. 5, line 3, replace "of-the" with --of the--

Col. 6, line 52, after "33" delete the comma.

Signed and Sealed this

Sixth Day of August, 1996

*Attest:*

BRUCE LEHMAN

*Attesting Officer*     *Commissioner of Patents and Trademarks*

REEXAMINATION CERTIFICATE (3759th)
United States Patent
Lucas et al.

[11] B1 5,445,069
[45] Certificate Issued May 11, 1999

[54] CITRUS JUICER

[75] Inventors: Rafael P. Lucas, Barcelona; Jose C. Blasco, L'Hospitalet; Antonio R. Rius, Manresa/Barcelona, all of Spain

[73] Assignee: Braun Aktiengesellschaft, Frankfurt, Germany

Reexamination Request:
No. 90/005,119, Sep. 28, 1998

Reexamination Certificate for:
Patent No.: 5,445,069
Issued: Aug. 29, 1995
Appl. No.: 07/842,245
Filed: Feb. 27, 1992

[21] Appl. No.: 07/842,245

Related U.S. Application Data

[62] Division of application No. 07/580,662, Sep. 11, 1990, Pat. No. 5,193,447.

[30] Foreign Application Priority Data

Sep. 16, 1989 [DE] Germany .................. 39 31 015.9
Sep. 16, 1989 [DE] Germany .................. 39 31 016.7

[51] Int. Cl.$^6$ .................. A47J 43/14; A23N 1/00
[52] U.S. Cl. .................. 99/508; 99/502; 99/503

[58] Field of Search .................. 99/501, 502, 503, 99/505, 506, 508; 210/377; 100/213, 132, 111

[56] References Cited

U.S. PATENT DOCUMENTS 4,110,221  8/1978  Moser .................. 210/481

FOREIGN PATENT DOCUMENTS 2347958  11/1977  France.
0819365   9/1951   Germany.
1259030   1/1968   Germany.
8908774  10/1989   Germany.
0362806   8/1962   Switzerland.

*Primary Examiner*—Reginald L. Alexander

[57] ABSTRACT

This invention relates to a citrus juicer for producing fruit juices. The motor-driven cone (11) is surrounded on all sides by a strainer (20) having passageways (27) under which a bowl for collecting the fruit juice is disposed. As a citrus fruit is squeezed, the resulting juice passes through the passageways of the strainer. The boundary area between the cone (11) and the area of the strainer (20) surrounding it is configured as an annular gap (25) whose cross section of passage is adapted to be increased or decreased by means of an adjusting device. The pulp content in the fruit juice is thereby predetermined.

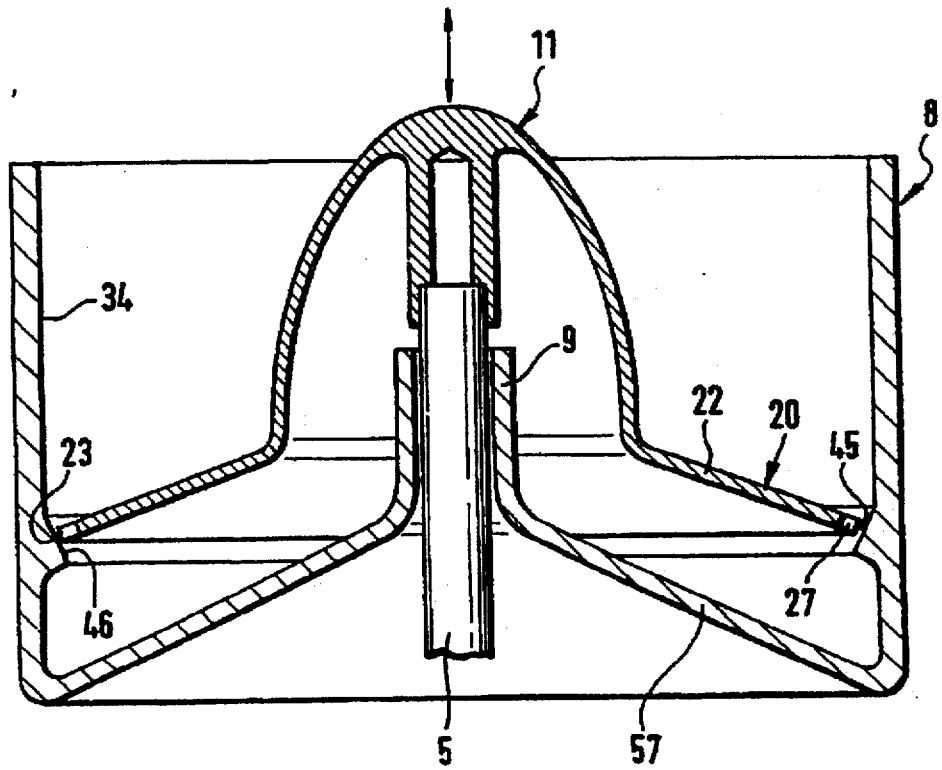

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *